(12) United States Patent
Carter

(10) Patent No.: US 7,407,062 B2
(45) Date of Patent: Aug. 5, 2008

(54) FILAMENT-REINFORCED COMPOSITE THERMOPLASTIC PRESSURE VESSEL FITTING ASSEMBLY

(75) Inventor: Thomas G. Carter, Kent, OH (US)

(73) Assignee: Enpress, L.L.C., Eastlake, OH (US)

( * ) Notice: Subject to any disclaimer, the term of this patent is extended or adjusted under 35 U.S.C. 154(b) by 0 days.

(21) Appl. No.: 11/458,802

(22) Filed: Jul. 20, 2006

(65) Prior Publication Data

US 2006/0289546 A1    Dec. 28, 2006

Related U.S. Application Data

(62) Division of application No. 10/614,773, filed on Jul. 8, 2003, now Pat. No. 7,100,262.

(51) Int. Cl.
    *F17C 1/06*    (2006.01)
(52) U.S. Cl. .................................................. 220/590
(58) Field of Classification Search ............... 220/581, 220/582, 586, 588, 589, 590, 591
    See application file for complete search history.

(56) References Cited

U.S. PATENT DOCUMENTS 4,690,295 A  *  9/1987  Wills ........................ 220/590
4,785,956 A  *  11/1988  Kepler et al. ................. 220/590
5,158,200 A     10/1992  Vago et al.
5,429,845 A  *  7/1995  Newhouse et al. ......... 428/34.1
5,556,497 A     9/1996  Murphy et al.
5,900,107 A     5/1999  Murphy et al.

* cited by examiner

*Primary Examiner*—Anthony D Stashick
*Assistant Examiner*—Harry A Grosso
(74) *Attorney, Agent, or Firm*—Rankin, Hill & Clark LLP

(57) ABSTRACT

A method of forming a fitting assembly in a filament-reinforced pressure vessel, and a pressure vessel having a fitting assembly secured therein. In the method, a first fitting portion is bonded to an inner surface of a thermoplastic liner in a fluid tight manner. A layer of commingled reinforcing filaments and plastic material is applied to an outer surface of the thermoplastic liner to form a vessel wall. A portion of the vessel wall adjacent to the opening bounded by the fluid-tight seal between the first fitting portion and the inner surface of the thermoplastic liner is removed. Then, a second fitting portion is bonded to the first fitting portion so as to define a port for access into the interior of the vessel.

8 Claims, 4 Drawing Sheets

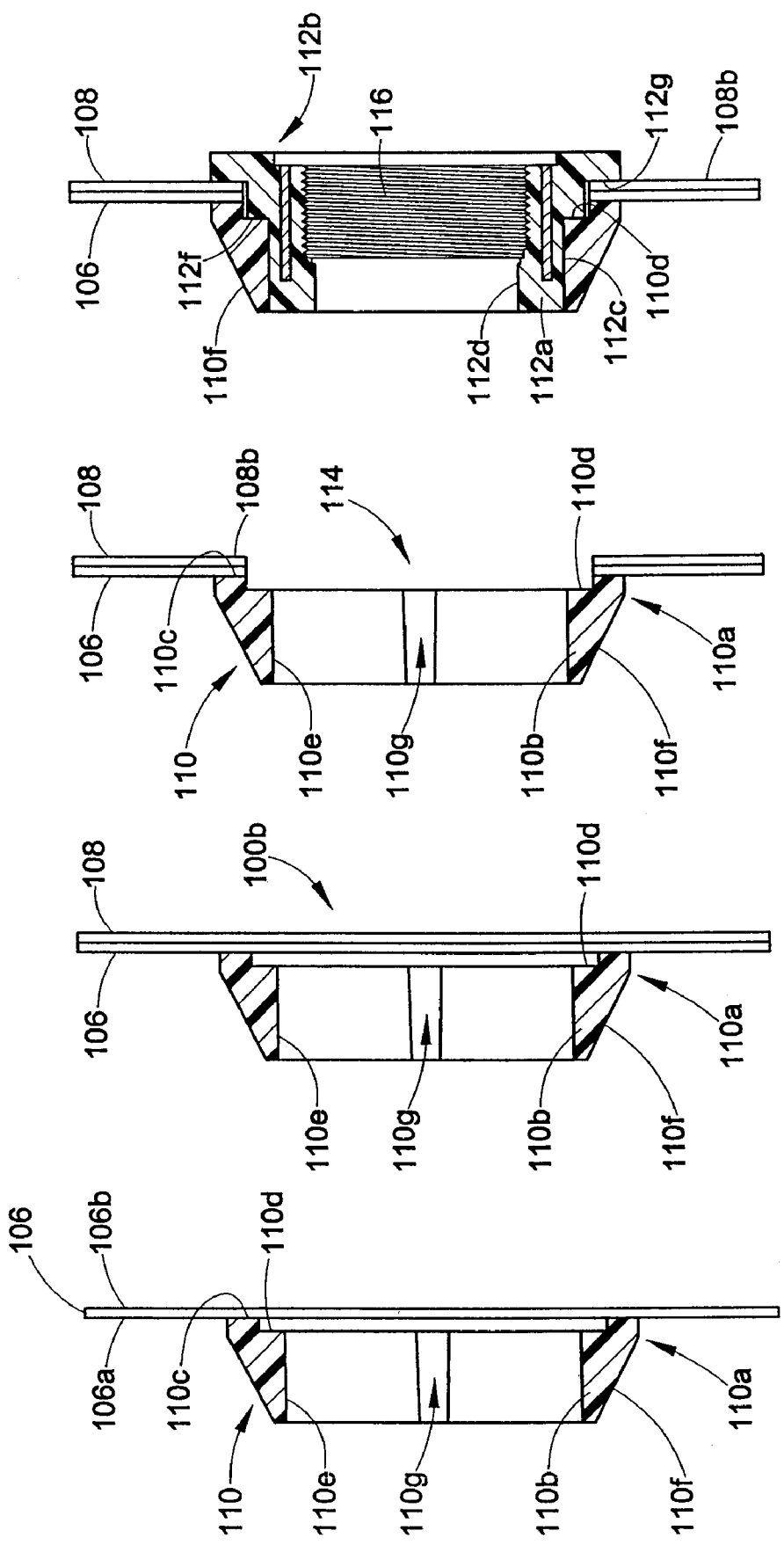

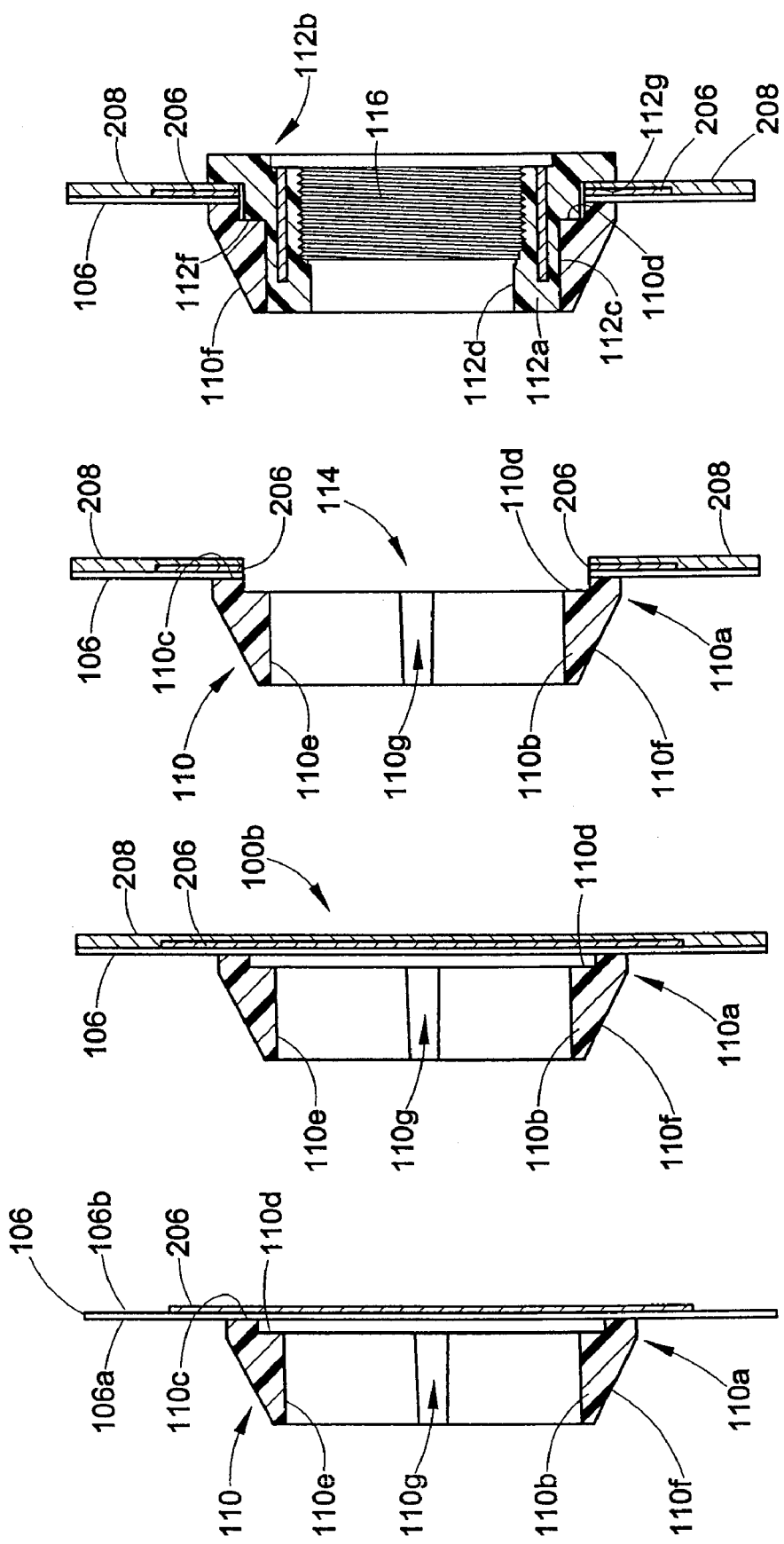

FILAMENT-REINFORCED COMPOSITE THERMOPLASTIC PRESSURE VESSEL FITTING ASSEMBLY

BACKGROUND OF THE INVENTION

1. Field of Invention

The present invention relates generally to a fitting assembly for composite pressure vessels and, more specifically, to a fitting assembly for filament-reinforced composite pressure vessels and methods of forming the same.

2. Description of Related Art

Reinforced pressure vessels are preferred for use in many fluid-containment applications because they are substantially lighter in weight than pressure vessels formed of traditional materials such as steel, and provide exceptional mechanical strength and corrosion resistance. The term "fluid" refers to any material or substance that changes shape or direction uniformly in response to an external force imposed on it and includes not only liquids, but also gases and finely divided solids.

The vessel wall of a filament-reinforced plastic pressure vessel is substantially continuous, and is formed of a composite laminated structure. The inner portion or layer of the vessel wall is typically a thermoplastic liner having an inner surface and an outer surface. The outer portion or layer of the vessel wall is typically formed of overlapping helically-wound reinforcing glass filaments that are wet-wrapped with thermoset plastic and bonded to the outer surface of the thermoplastic liner.

As is the case with all fluid-containment vessels, the aforementioned conventional thermoset and thermoplastic composite pressure vessels need at least one port, and frequently several ports, for providing access to fill and/or empty the vessel and/or for permitting the attachment of devices that monitor the pressure and/or other conditions within the interior of the vessel. These ports are commonly provided as rigid fittings that are adapted to connect to hoses, pipes and/or measurement equipment (e.g., pressure sensors and gauges).

Unfortunately, a port cannot usually be added to the aforementioned conventional thermoset and thermoplastic pressure vessel simply by drilling or cutting a hole in the vessel wall and bonding a port structure around the hole (or vice versa). It is commonly believed that, unless the port structure is bonded to the thermoplastic liner and the thermoset and filament reinforced outer layer, the mechanical strength of the pressure vessel is substantially weakened. Moreover, in conventional vessels, severing the continuous filament reinforcement undermines the strength of the vessel.

Therefore, there exists a need in the art for an improved composite pressure vessel, and for a method for forming a port in a sidewall thereof. There further exists a need in the art for a fitting assembly that is adapted to be efficiently secured to the pressure vessel so as to define a port therein.

SUMMARY OF THE INVENTION

The present invention provides methods of securing or installing a fitting assembly in a filament-reinforced composite pressure vessel. The present invention is further directed toward a fitting assembly that is adapted for efficient sealing attachment to a composite pressure vessel.

In accordance with a method of the present invention, a first fitting portion is bonded to an inner surface of a thermoplastic liner so as to form a fluid-tight seal with the liner. Domes or endcaps are secured to ends of the liner, and a layer of commingled reinforcing filaments and thermoplastic polymer is applied and bonded to an outer surface of the thermoplastic liner. The thermoplastic liner, endcaps, and filament-reinforcing outer layer cooperate to form the vessel, while the thermoplastic liner and reinforcing layer cooperate to form a vessel sidewall. A portion of the vessel sidewall bounded by the fluid-tight seal between the first fitting portion and the inner surface of the thermoplastic liner is removed to define a passageway into the vessel interior. Then, a second fitting portion is inserted through the passageway and bonded to the first fitting portion and to the vessel wall surrounding the passageway. The second fitting portion, which cooperates with the first fitting portion to define a port between an interior of the vessel and an exterior of the vessel, is bonded to the first fitting portion and the outer surface of the vessel outer layer.

In accordance with another method of the present invention, the first fitting portion is bonded to an inner surface of the thermoplastic liner so as to form a fluid-tight seal with the liner. Domes or endcaps are secured to ends of the liner, and a layer of commingled reinforcing filaments and thermoset polymer is applied and bonded to an outer surface of the thermoplastic liner. The thermoplastic liner, endcaps, and filament-reinforcing outer layer cooperate to form the vessel, while the thermoplastic liner and reinforcing layer cooperate to form a vessel sidewall. A portion of the vessel sidewall bounded by the fluid-tight seal between the first fitting portion and the inner surface of the thermoplastic liner is removed to define a passageway into the vessel interior. Then, a second fitting portion is inserted through the passageway and bonded to the first fitting portion. The second fitting portion, which cooperates with the first fitting portion to define a port between an interior of the vessel and an exterior of the vessel, is bonded to the first fitting portion.

Preferably, the first fitting portion and the second fitting portion are formed of fiber-reinforced thermoplastic material. Optionally, the first fitting portion and/or the second fitting portion can include metal reinforcements. All bonds are preferably formed using heat rather than adhesives. Conventional reinforcing filaments such as, for example, filaments formed of glass, aramid and carbon fibers, can be used in the invention. Thermoplastic-coated glass filaments and thermoplastic-impregnated woven glass fabrics are preferred.

The present invention also provides a filament-reinforced pressure vessel having at least one fitting assembly formed in the vessel wall. The fitting assembly comprises a first fitting portion and a second fitting portion. The first fitting portion is bonded to the inner surface of a thermoplastic liner so as to form a fluid-tight seal around an opening of a passageway through the first fitting portion and the vessel wall. The second fitting portion is bonded to the first fitting portion and, should the vessel be reinforced with a thermoplastic and filament reinforcing layer, to the vessel wall surrounding the opening. The first and second fitting portions cooperate to define a port between the interior and exterior of the vessel. In a preferred embodiment, the second fitting portion is internally reinforced and threaded to facilitate connection of a hose, pipe or other fluid conveyance or measurement device.

Filament-reinforced pressure vessels formed in accordance with the invention provide several advantages over the prior art. The method readily facilitates the resizing and/or relocation of ports without the need for new molds, excessive preparation or labor, or expensive equipment. Vessels having ports formed in accordance with the invention retain their mechanical strength. Further, the openings for the fitting assembly can be formed in the vessel wall following application of the reinforcing layer, greatly facilitating manufacture of the vessel.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

FIG. 1b is a cross-sectional view of the vessel of FIG. 1a.

FIGS. 3a through 3d are cross-sectional views of portions of a fitting assembly being bonded to a vessel wall of a filament-reinforced thermoplastic pressure vessel according to the invention.

FIGS. 4a through 4d are cross-sectional views of portions of a fitting assembly being bonded to a vessel wall of a filament-reinforced thermoset and thermoplastic composite pressure vessel according to the invention.

DETAILED DESCRIPTION OF THE PREFERRED EMBODIMENTS

Figure 1A:
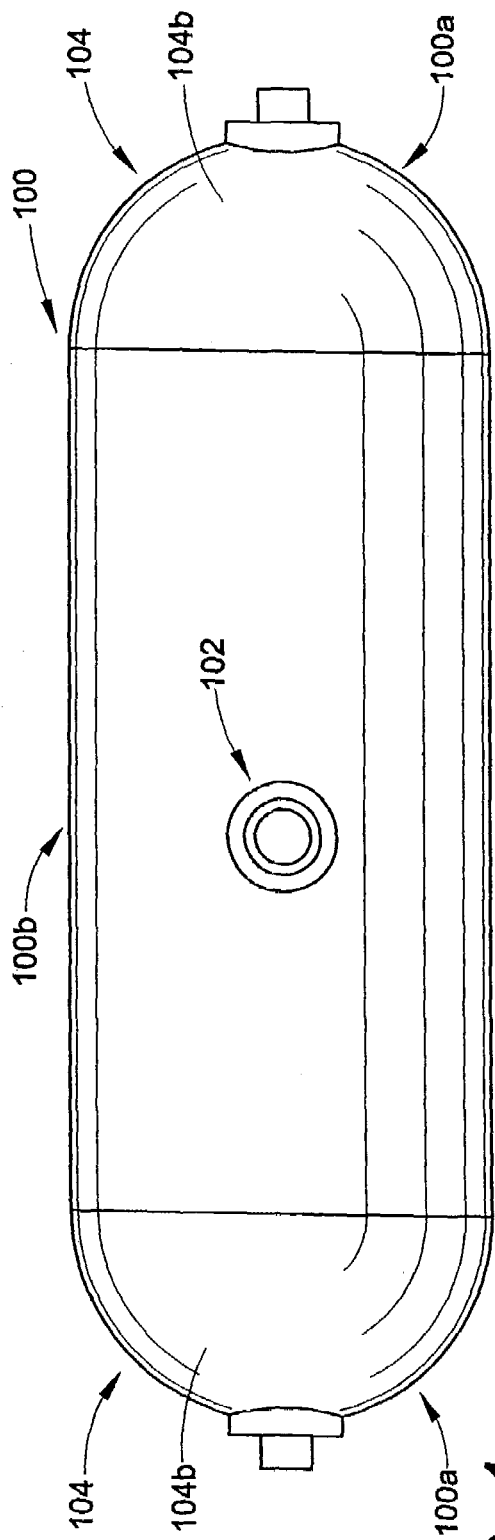
FIG. 1a is a top plan view of a filament-reinforced thermoplastic pressure vessel according to the invention.

An exemplary filament-reinforced thermoplastic pressure vessel 100 according to the invention is shown in FIG. 1a. The vessel 100 defines a fluid-containment cavity and has at least one fitting assembly 102 formed in the vessel sidewall 100b. In the embodiment shown in FIG. 1a, the fitting assembly 102 is formed in the vessel sidewall 100b. However, it is considered apparent that plural fitting assemblies 102 in accordance with the present invention may readily be installed in a single vessel 100.

Figure 1B:
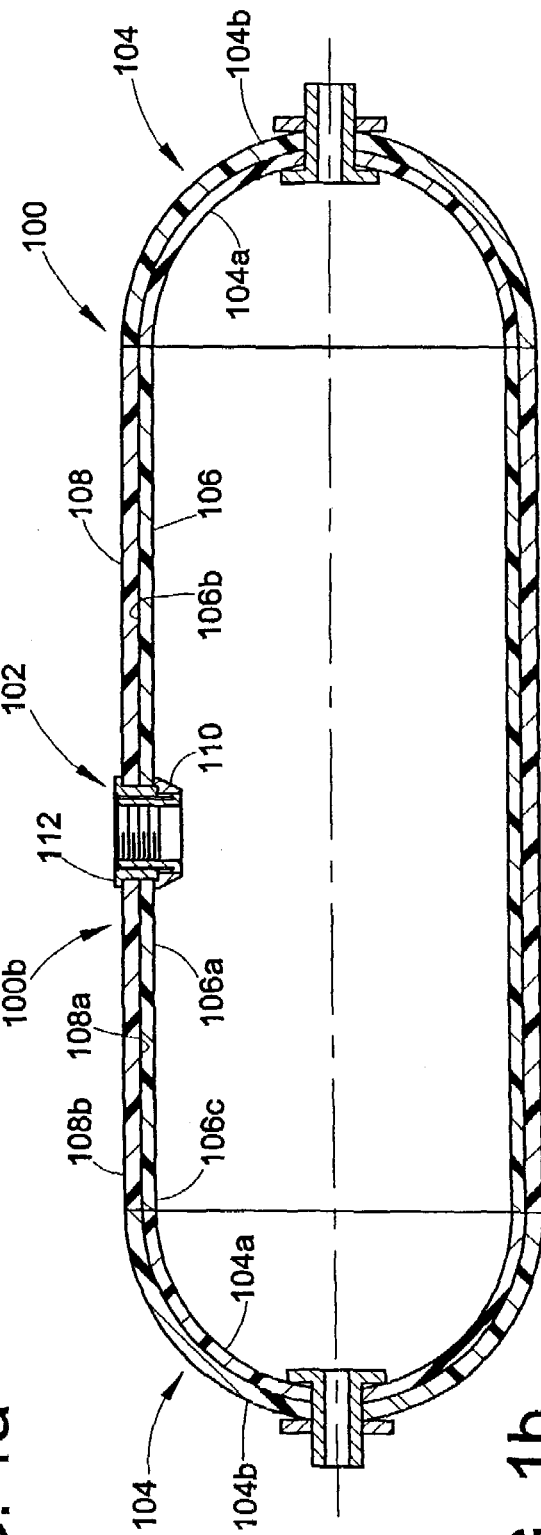
Figure 2:
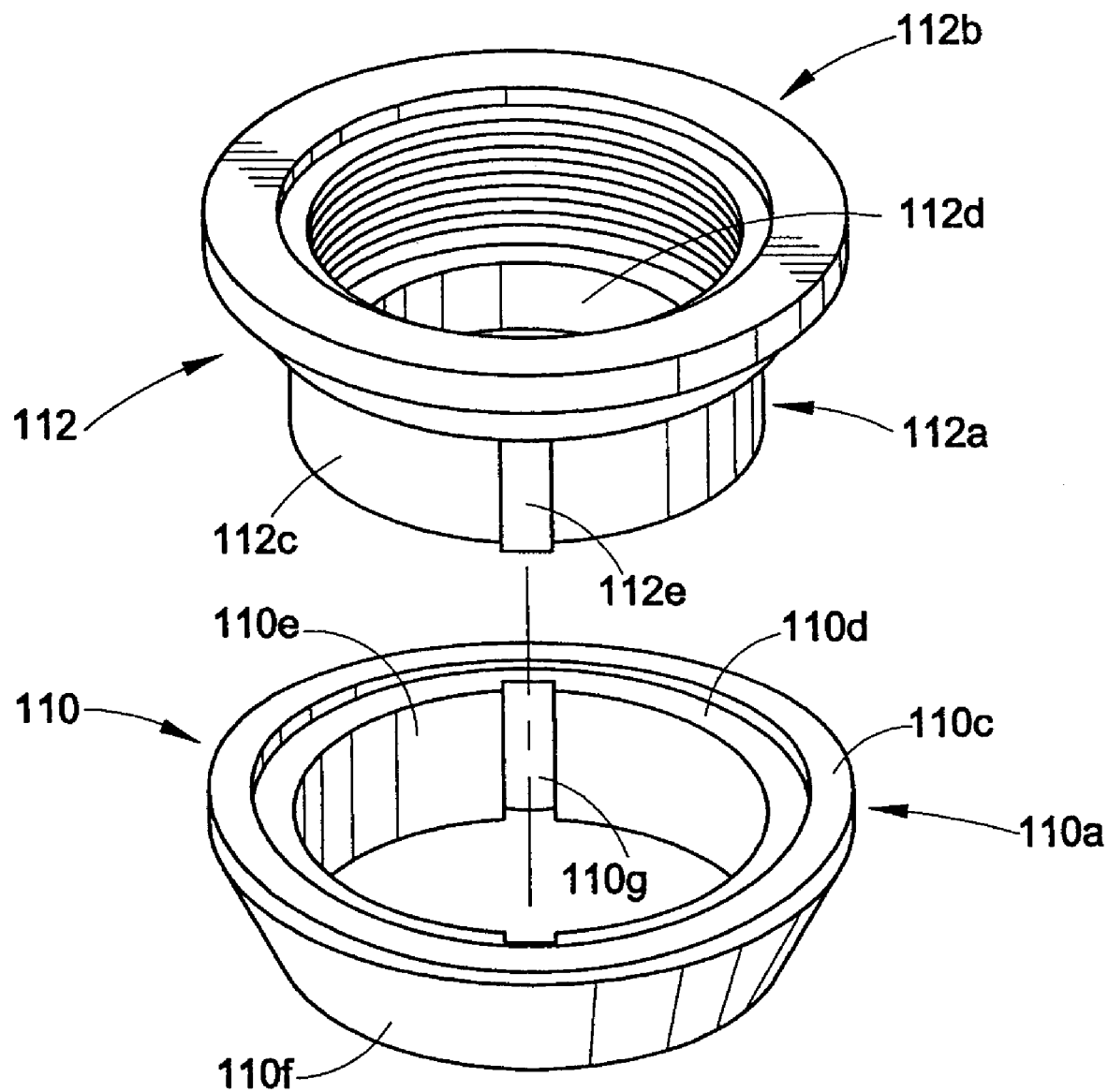
FIG. 2 is an exploded perspective view of a fitting assembly according to the invention.

FIG. 1b is a cross-sectional view through the vessel 100 and the fitting assembly 102. The vessel 100 includes a pair of domes or endcaps 104, an inner thermoplastic liner 106, and an outer reinforcing layer 108. The thermoplastic liner 106 is generally cylindrical, having an inner surface 106a, an outer surface 106b, and first and second ends 106c that are each bonded to one of the domes 104, respectively. The outer reinforcing layer 108 is formed from commingled thermoplastic and reinforcing fibers, and is integrally bonded to the outer surface 106b of the inner liner 106. The inner surface 106a of the thermoplastic liner 106 contacts the fluid(s) contained in the vessel 100. The thermoplastic liner 106 can be formed from a variety of thermoplastic polymers. In view of costs and performance, polyolefins such as polyethylene, for example, are preferred.

The thermoplastic liner 106 is preferably a substantially unitary structure that is formed by conventional polymer processing methods such as rotational molding, blow molding, and extrusion. The endcaps or domes 104 are preferably formed by compression molding an inner thermoplastic layer 104a to an outer thermoplastic and glass reinforcing layer 104b.

In the presently most-preferred embodiment of the invention, a commingled thermoplastic and glass fiber fabric, such as is sold as TWINTEX fabric by Saint-Gobain Vetrotex America, Inc. of Valley Forge, Pa., is compression molded with a thermoplastic inner layer into an end cap 104. The thus-formed composite end caps 104 are then joined to each end of an extruded thermoplastic cylindrical liner. A reinforcing layer in the form of continuous glass filaments encapsulated or coated (commingled) with thermoplastic polymer, such as is sold as TWINTEX rovings by Saint-Gobain Vetrotex America, Inc., are then circumferentially wound around and bonded to the cylindrical liner 106 and at least a portion of the endcaps 104 to form the composite vessel 100 having a pair of curved or semi-hemispherical ends 100a and a sidewall 100b. For further information on preferred structures and methods for forming the vessel, reference should be made to the assignee's co-pending application Ser. No. 10/268,823, entitled "Composite Pressure Vessel Assembly And Method", which is hereby expressly incorporated by reference in its entirety.

As noted above, the outer reinforcing layer 108, which comprises reinforcing filaments commingled with thermoplastic polymer, is bonded to the outer surface 106b of the thermoplastic liner 106, preferably by partially melting at least one of the thermoplastic material of the reinforcing layer and the outer surface of the thermoplastic liner, and applying and adhering the reinforcing layer 108 onto the liner 106. Accordingly, an inner surface 108a of the outer layer 108 is integrally bonded to the outer surface 106b of the liner 106, while the outer surface 108b of the outer layer 108 is exposed to the surrounding environment.

The reinforcing filaments can be glass fibers, aramid fibers, and/or carbon fibers, among others. The commingled reinforcing filaments and thermoplastic polymer can be wound around the thermoplastic liner 106 as continuous single strands in a helical or substantially circumferential direction, and/or can be pre-woven into a fabric material that is bonded to the outer surface 106b of the thermoplastic liner 106.

At least one fitting assembly 102 is affixed to the vessel 100 and extends through the vessel sidewall 100b. Each fitting assembly 102 comprises a first fitting portion 110 and a second fitting portion 112.

The first fitting portion 110 has enlarged first or proximal end 110a and a body 110b extending away from the proximal end 110a. The proximal end 110a has a stepped surface including a radially outer annular surface 110c and a radially inner annular surface 110d. The radially inner annular surface 110d is recessed relative to the radially outer annular surface 110c. Thus, the radially outer annular surface 110c defines the first or proximal end face of the first fitting portion 110 while the radially inner annular surface 110d, which is surrounded by the radially outer annular surface 110c, is relatively recessed relative to the proximal end face.

The first fitting portion body 110b has an outer surface 110f and an inner surface 110e. The inner surface 110e preferably has a pair of lengthwise extending grooves 110g formed therein. The grooves 110g taper or narrow as the body 110b extends away from the proximal end face. The grooves 110g are adapted to receive correspondingly shaped tabs or ribs 112e that extend radially from an outer surface 112c of the second fitting portion 112, to be described hereinafter.

The second fitting portion 112 includes a tubular body 112a and a stepped outer portion 112b. The second fitting portion tubular body has an outer surface 112c and an inner surface 112d, and is sized such that the outer surface 112c is frictionally received in an interference-type fit against the inner surface 110e of the first fitting portion body 110b. The outer surface 112c of the second fitting portion tubular body 112b includes a pair of lengthwise tapering tabs or ribs 112e that are snuggly received within the grooves 110g formed in the inner surface 110e of the first fitting portion 110, described hereinbefore. Inserting the tabs or ribs 112e into the grooves 110g also insures proper alignment between the first and second fitting portions 110, 112.

The stepped outer portion 112b includes a first or inner flange 112f and a second or outer flange 112g. The first flange 112f is adapted to engage the first fitting portion inner annular surface 110d in a face-to-face manner. Similarly, the second or outer flange 112g is adapted to engage the outer surface 108b of the outer reinforcing layer 108 in a face-to-face manner, as will be apparent from the following discussion.

The method of assembling the vessel 100 including the fitting assembly 102 of the present invention will be described hereinafter with reference to FIGS. 3a-3d. First, with reference to FIG. 3a, the first fitting portion 110 is shown bonded to the inner surface 106a of the thermoplastic liner 106. More specifically, the proximal end face or outer annular surface 110c is bonded to the inner surface 106a of the liner 106 so as to form a fluid-tight seal between the first fitting portion 110 and the liner inner surface 106a. Thereafter, assembly of the vessel 100 is completed, as described hereinbefore, such that the endcaps or domes 104 are secured to opposite ends of the liner 106, and the liner 106 is overwrapped with the reinforcing layer 108. FIG. 3b depicts the fitting assembly installation process following further assembly of the vessel 100.

Thereafter, the location of the first fitting portion 110 is determined, preferably using automated or manual laser (optical) or density measuring devices or other devices that are known in the art, and the vessel sidewall 100b is bored or machined so as to form an opening 114 therein that is aligned with the first fitting portion 110. The opening 114 has a diameter that is generally equal to the diameter of the first fitting portion inner annular surface 110d, so that the inner annular surface 110d is revealed. Following this step, the assembly is substantially as illustrated in FIG. 3c.

Thereafter, with reference to FIG. 3d, the second fitting portion 112 is inserted through the opening 114 and into the first fitting portion 110. Accordingly, the tabs or ribs 112e of the second fitting portion 112 are slidably inserted into the grooves 110g formed in the first fitting portion body 110b, the outer surface 112c of the second fitting portion tubular body 112a is slidably received against the first fitting portion body inner surface 110e, the second fitting portion inner flange 112f is in face-to-face contact with the first fitting portion inner annular surface 110d, and the second fitting portion outer flange 112g is in face-to-face contact with the outer surface 108b of the reinforcing layer 108.

Thereafter, the second fitting portion 112 is bonded to the first fitting portion 110 and the vessel sidewall 100b so as to provide a unitary structure. Preferably, the fitting portions 110, 112 are bonded by vibration welding so as to provide a continuous weld or bond between the first and second fitting portions 110, 112 (i.e., between the outer surface 112c of the second fitting portion 112 and the inner surface 110e of the first fitting portion 110) and between the inwardly facing surface of the second fitting portion outer flange 112g and the outer reinforcing layer 108.

With reference to FIGS. 4a-4d, a second embodiment of the method and apparatus, wherein the fitting assembly is secured to a filament reinforced thermoset and thermoplastic composite pressure vessel, is illustrated. Insofar as the second embodiment has several elements in common with the previously described first embodiment, identical reference numerals have been used for such common elements in FIGS. 4a-4d, and a description of these common elements is not provided hereinafter.

FIG. 4a illustrates a first or preliminary step wherein the first fitting portion 110 is secured to an inner surface 106a of the thermoplastic liner 106. An optional reinforcing fabric layer 206, preferably formed from an woven fabric mat, is affixed to the liner outer surface 106b in alignment with the location of the first fitting portion 110 so as to surround and reinforce the area surrounding the opening 114, to be subsequently formed therein.

Following the preliminary attachment of the first fitting portion 110 and, optionally, the reinforcing fabric layer 206, and assuming that the vessel liner manufacture is completed so as to define a unitary liner structure, the liner is wet wrapped with a composite thermoset and reinforcing filament layer 208 (FIG. 4b).

Thereafter, the location of the first fitting portion 110 is determined, preferably using automated or manual laser (optical) or density measuring devices or other devices that are known in the art, and the vessel sidewall 100b is bored or machined so as to form an opening 114 therein that is aligned with the first fitting portion 110. The opening 114 has a diameter that is generally equal to the diameter of the first fitting portion inner annular surface 110d, so that the inner annular surface 110d is revealed. Following this step, the assembly is substantially as illustrated in FIG. 4c.

Thereafter, with reference to FIG. 4d, the second fitting portion 112 is inserted through the opening 114 and into the first fitting portion 110. Accordingly, the tabs or ribs 112e of the second fitting portion 112 are slidably inserted into the grooves 110g formed in the first fitting portion body 110b, the outer surface 112c of the second fitting portion tubular body 112a is slidably received against the first fitting portion body inner surface 110e, the second fitting portion inner flange 112f is in face-to-face contact with the first fitting portion inner annular surface 110d, and the second fitting portion outer flange 112g is in face-to-face contact with the outer surface 108b of the reinforcing layer 208.

Thereafter, the second fitting portion 112 is bonded to the first fitting portion 110 so as to provide a unitary structure. Preferably, the fitting portions 110, 112 are bonded by vibration welding so as to provide a continuous weld or bond between the first and second fitting portions 110, 112 (i.e., between the outer surface 112c of the second fitting portion 112 and the inner surface 110e of the first fitting portion 110).

Although the fitting assembly has been described hereinbefore as being secured to the vessel sidewall 100b, it is considered apparent that the fitting assembly 102 may, instead, be secured at one or both of the endcaps or domes 104 with equal functionality.

The first and second fitting portions 110, 112 are both preferably formed of fiber-reinforced thermoplastic materials by injection molding. In order to facilitate melt bonding, the material used to fabricate the thermoplastic liner 106 is also preferably used to fabricate the first fitting portion 110 and the second fitting portion 112. In the presently most preferred embodiment of the invention, the thermoplastic liner 106 is formed of polyethylene, and the first and second fitting portions 110, 112 are formed of fiberglass-filled polyethylene. Optional metal reinforcements 116, such as shown in FIG. 3d, can be used to increase the strength of the first fitting portion 110 and/or the second fitting portion 112 to increase the fitting assembly's hoop strength.

Although not shown in the drawings, it will be appreciated that the profile of the surface of the first fitting portion 110 that contacts and is bonded to the inner surface 106a of the thermoplastic liner 106 will have some amount of curvature in order to ensure the formation of a fluid-tight seal upon bonding. The degree of curvature will depend upon the size of the vessel 100 and the location and size of the fitting assembly 102. Likewise, the profile of the surface of the second fitting portion 112 that contacts and is bonded to the reinforcing layer 108 of the vessel 100 will also have to include some amount of curvature in order to ensure the formation of a fluid-tight seal upon bonding.

The fitting assembly 102 is configured to provide a port between the fluid-containment cavity and an exterior of the vessel 100. In a preferred embodiment, the second fitting portion 112 is internally threaded to facilitate connection of a hose, pipe or other fluid conveyance or measurement device to the vessel. Naturally, the second fitting portion may be extended so as to provide an external thread, if desired.

All bonding referred to in this specification and in the appended claims is preferably accomplished using heat (e.g., melt bonding, laser welding, vibration welding, infrared welding, etc.). Adhesives can be used, but in view of the simplicity and ease by which heat can be used to bond the various components together, adhesives are preferably not used.

Bonding of the first fitting portion 110 to the inner surface 106a of the thermoplastic liner 106 is not problematic because the bonding is accomplished before the endcaps or domes 104 are secured or bonded to the liner ends 106c. Thus, access to the inner surface 106a during placement of the first fitting portion 110 thereto is not impeded in any way.

In the first embodiment, application of the outer reinforcing layer 108 to the liner 106 is also not problematic because there are no protruding structures around which such materials must be wrapped. In the second embodiment, application of the outer reinforcing layer 208 over the liner 106 and optional reinforcing mat 206 is also not problematic. The reinforcing filaments can be oriented in an optimal way to provide the greatest mechanical strength without concern for the location of ports or protrusions from the vessel sidewall 100b.

Additional advantages and modifications will readily occur to those skilled in the art. Therefore, the invention in its broader aspects is not limited to the specific details and illustrative embodiments shown and described herein. Accordingly, various modifications may be made without departing from the spirit or scope of the general inventive concept as defined by the appended claims and their equivalents.

What is claimed is:

1. A filament-reinforced pressure vessel comprising:
    a fluid-containment cavity defined by a substantially continuous vessel wall, the vessel wall comprising:
        a thermoplastic liner having an inner surface and an outer surface; and
        an outer layer comprising reinforcing filaments and a plastic material, said outer layer being bonded to the outer surface of the thermoplastic liner; and
    at least one unitary thermoplastic fitting assembly formed in the vessel wall, the unitary thermoplastic fitting assembly comprising:
        a first thermoplastic fitting portion bonded to the inner surface of the thermoplastic liner so as to form a fluid-tight seal around an opening of a passageway through the first thermoplastic fitting portion and the inner surface of the thermoplastic liner; and
        a second thermoplastic fitting portion extending through the outer layer and the liner and being permanently bonded to the first fitting portion so as to form the unitary thermoplastic fitting assembly, said first and second fitting portions defining a port between the fluid-containment cavity and an exterior of the vessel.

2. The pressure vessel according to claim 1, wherein the plastic material is a thermoplastic and wherein the second fitting portion is also bonded to the outer layer.

3. The pressure vessel according to claim 2, wherein the first fitting portion and the second fitting portion are formed of fiber-reinforced thermoplastic material.

4. The pressure vessel according to claim 2, wherein the reinforcing filaments are selected from a group consisting of glass filaments, aramid filaments and carbon filaments.

5. The pressure vessel according to claim 2, wherein the first fitting portion further comprises a peripheral seat section adjacent to the opening, and the second fitting portion is configured to contact and be bonded to the seat section.

6. The pressure vessel according to claim 2, wherein the passageway through the first fitting portion comprises a tapered section and the second fitting portion is configured to frictionally engage the tapered section prior to being bonded to the first fitting portion.

7. The pressure vessel according to claim 6, wherein the tapered section of the passageway through the first filling portion further comprises an alignment slot and the second filling portion is configured with a rib that slides into the alignment slot to ensure that the second fitting portion is properly aligned relative to the first filling portion prior to being bonded to the first fitting portion.

8. The pressure vessel according to claim 2, wherein said plastic material is a thermoset plastic material.

* * * * *